United States Patent [19]

Ishiyama et al.

[11] Patent Number: 5,063,744
[45] Date of Patent: Nov. 12, 1991

[54] ACTUATOR FOR CONTROLLING INTAKE PRESSURE IN SEQUENTIAL TURBO-SYSTEM

[75] Inventors: Shinobu Ishiyama, Numazu; Teruo Kumai, Gotenba; Kazuyoshi Ishisaka; Toshiyuki Maehara, both of Susono; Makoto Fujimori; Kimio Nemoto, both of Obu, all of Japan

[73] Assignees: Toyota Jidosha Kabushiki Kaisha; Aisen Industry Co., Ltd., both of Japan

[21] Appl. No.: 415,918

[22] Filed: Oct. 2, 1989

[30] Foreign Application Priority Data

| Oct. 6, 1988 | [JP] | Japan | 63-250928 |
| Nov. 21, 1988 | [JP] | Japan | 630150690[U] |
| Nov. 22, 1988 | [JP] | Japan | 63-152861[U] |
| Feb. 21, 1989 | [JP] | Japan | 1-18402[U] |

[51] Int. Cl.$^5$ ............................................. F02B 37/12
[52] U.S. Cl. ............................................. 60/600; 60/612
[58] Field of Search ................. 60/600, 601, 602, 603, 60/612

[56] References Cited

U.S. PATENT DOCUMENTS 4,283,912  8/1981  Cholvin .............................. 60/602

FOREIGN PATENT DOCUMENTS

| 142226 | 6/1980 | German Democratic Rep. ... | 60/612 |
| 190516 | 11/1983 | Japan ............................... | 60/612 |
| 16130 | 1/1988 | Japan ............................... | 60/612 |

Primary Examiner—Michael Koczo

[57] ABSTRACT

In a sequential turbocharger system having a first stage large volume turbo-charger and a second stage small volume turbocharger, a diaphragm actuator is provided for an exhaust bypass valve bypassing a turbine of the small volume turbocharger. The diaphragm actuator has a two step characteristic in relation to an opening of the exhaust bypass valve, so that an increased speed of opening of the exhaust bypass valve is obtained when the pressure downstream of the compressor of the first turbocharger is equal to the pressure downstream of the compressor of the second turbocharger.

25 Claims, 13 Drawing Sheets

ACTUATOR FOR CONTROLLING INTAKE PRESSURE IN SEQUENTIAL TURBO-SYSTEM

BACKGROUND OF THE INVENTION

1. Field of the Invention

The present invention relates to a two stage turbocharger system for an internal combustion engine, and provided with two turbochargers arranged in series in the direction of the gas flow.

2. Description of the Related Art

Known in the prior art is a two stage turbocharger system for an internal combustion engine wherein two turbochargers are arranged in series in the direction of the gas flow, to obtain a desired performance of the engine over a wide operating range from a low speed to a high speed. In this case, one of the turbochargers is a small volume unit used for operation in the low speed range, and the other turbocharger is a large volume unit used for operation in the high speed range. Note, the small volume turbocharger is arranged near to the engine so that the exhaust gas from the engine is first supplied to the turbine of the small volume turbocharger and then to the turbine of the large volume turbocharger. Conversely, the air fed to the engine is first compressed by the compressor of the large volume turbocharger and then by the compressor of the small volume compressor.

In such a combination of small and large turbochargers, both units are constantly operated, which results in a lower efficiency during an engine high speed condition because energy is unnecessarily consumed. Therefore, to increase the efficiency, a system is provided wherein a bypass control device is provided so that both the small volume and the large volume turbochargers are operated during a low speed condition but only the large volume turbocharger is operated during a high speed condition, as disclosed in Japanese Unexamined Utility Model Publication No. 50-129815 and No. 59-82526.

The bypass control device is provided with a passageway bypassing the turbine of the small volume turbocharger, and a bypass control valve arranged in the bypass passageway and responsive to the intake pressure at the output of the small volume turbocharger. Accordingly, when the engine speed becomes high, the bypass control valve is opened and exhaust gas from the engine is made to bypass the turbine of the small volume turbocharger, resulting in an increased efficiency. The bypass control valve is constructed as a diaphragm valve having a diaphragm opened to the engine intake passageway downstream of the compressor of the small volume turbocharger, and a spring urging the diaphragm to close the valve. Accordingly, when a pressure of the intake passageway downstream of the compressor is higher than a preset value corresponding to the spring coefficient of the spring, the diaphragm is moved against the force of the spring. As the pressure is further increased, the force acting on the diaphragm to displace same becomes larger. Therefore, this type of bypass control valve has a linear characteristic between the degree of opening of the valve and the pressure applied to the diaphragm, and this linear characteristic is determined by the spring coefficient of the spring.

Nevertheless, this single stage spring bypass control valve suffers from a drawback in that there is a drop in the rate of increase of the turbo-pressure at an intercept point. This intercept point is defined as a point corresponding to the engine speed at which, the increase in the turbo-pressure begins to level off to the target turbo-pressure. The most desirable characteristic is that in which the pressure at the intercept point is equal to the target turbo-pressure, but it is difficult to obtain this characteristic with the usual single stage spring actuator, since this spring has only one spring coefficient value. If the spring coefficient value is made larger, the intake pressure can be higher than the desired intake pressure when the engine speed is high, but if the spring coefficient value is made lower, the valve is prematurely opened causing the pressure at the intercept point to fall.

An increase of the intake pressure at the intercept point is possible if the full stroke position of the intake by-pass control valve is not reached at the point at which the large volume turbocharger is fully activated. This, however, causes an excessively high rotation speed of the small volume turbocharger, which shortens the service life of the small volume turbocharger and lowers the fuel consumption efficiency, since the small volume turbocharger is operated unnecessarily.

SUMMARY OF THE INVENTION

An object of the present invention is to provide a turbocharger system by which the intake pressure at the intercept point can be increased while preventing an unnecessary operation of the turbocharger system.

Therefore, according to the present invention, an internal combustion engine is provided which comprises:

(a) an engine body;

(b) an intake system connected to the engine body for an introduction of a combustible mixture of gas thereto;

(c) an exhaust system connected to the engine body for removal of combustion gas therefrom;

(d) a first stage large volume turbocharger having a turbine wheel arranged in the exhaust system and driven by the flow of exhaust gas, and a compressor arranged in the intake system and mechanically connected to the turbine to pressurize intake air;

(e) a second stage small volume turbocharger having a turbine arranged in the exhaust system upstream of the turbine wheel of the first stage large volume turbocharger, in the direction of the flow of exhaust gas, and driven by the flow of exhaust gas, and a compressor arranged in the intake system downstream of the compressor of the first stage large volume turbocharger in the direction of flow of intake air to further pressurize the intake air;

(f) an exhaust bypass passageway connected to the exhaust system in such a manner that the flow of exhaust gas bypasses the turbine of the second stage small volume turbocharger;

(g) an exhaust bypass control valve arranged in said exhaust bypass passageway for controlling the amount of exhaust gas bypassing the second stage small volume turbocharger, and;

(h) bypass control means, responsive to the intake pressure downstream from the compressor of the second stage turbocharger, for controlling the exhaust bypass control valve in such a manner that the bypass control valve is gradually opened until said pressure reaches a predetermined pressure value, and rapidly opened after said pressure reaches said predetermined value, thereby to obtain the speed of two-step opening speed characteristic.

According to another aspect of the present invention, a valve assembly is provided for controlling a bypass valve in a bypass passageway bypassing a small volume turbocharger located nearer the engine than a large turbocharger, in a sequential turbocharger system, said valve assembly comprising a valve member arranged in the bypass passageway, a connecting member connected to the exhaust bypass valve, a flexible member connected to the connecting member, a spring urging the flexible member to close the bypass control valve, and a control chamber on one side of the flexible member, the control chamber being connected to the intake system downstream of the second stage small volume turbocharger so that the bypass control valve is opened when the pressure level in the control chamber is higher than a predetermined level, and a means for defining a second chamber to which a control pressure is introduced for generating an additional force to be transmitted to the connecting member to increase the speed of movement of the valve member.

DESCRIPTION OF THE PREFERRED EMBODIMENTS

Figure 1:
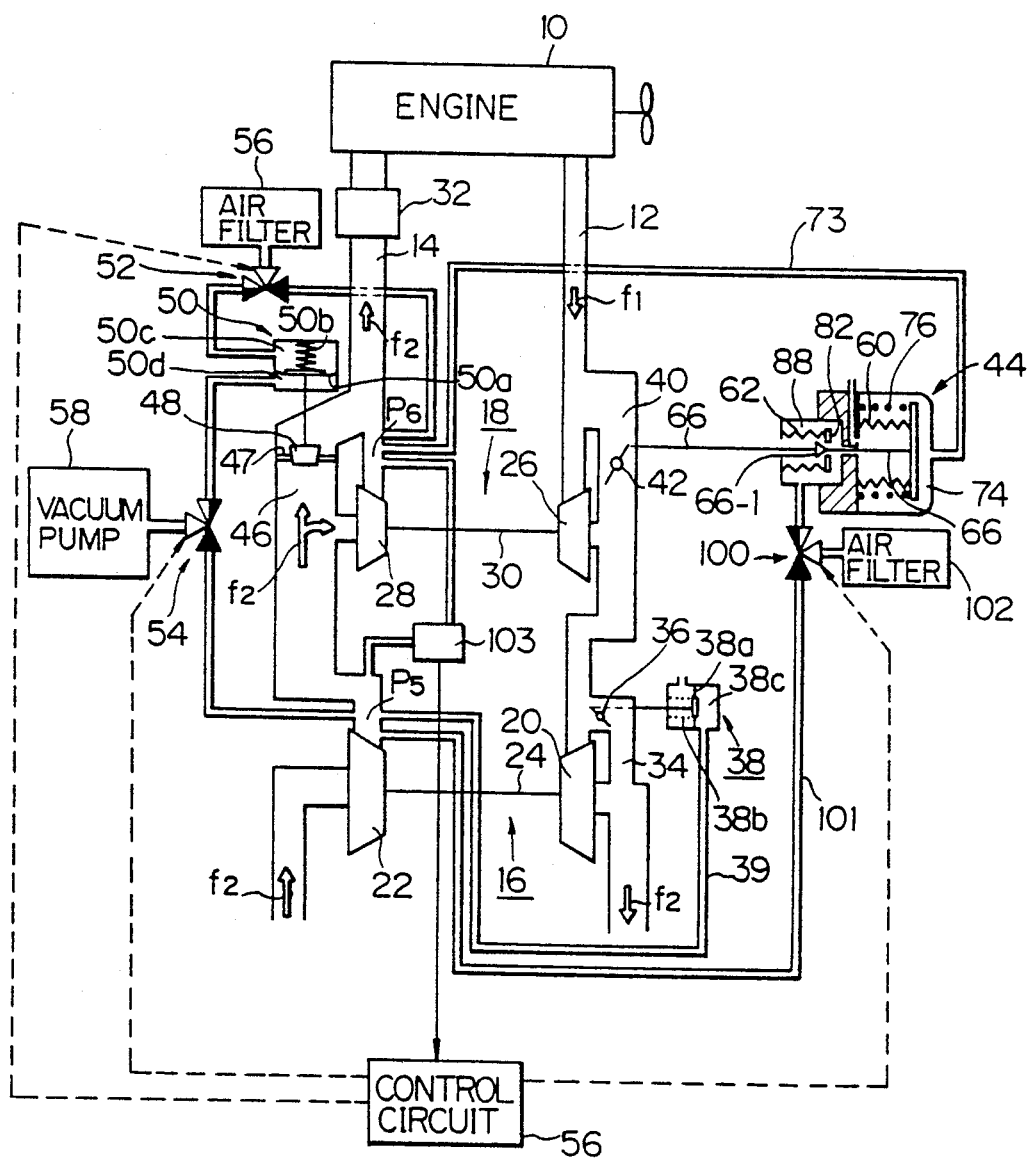
FIG. 1 is diagram of a turbocharger system according to the present invention.

Referring to FIG. 1, which shows an internal combustion engine provided with a two stage turbo system, 10 denotes an engine body to which an intake system defining an intake passageway 12 and an exhaust system defining an exhaust passageway 14 are connected, and for which two turbochargers 16 and 18 are provided in series. A first stage turbocharger 16 having a large volume is located away from the engine and comprises a turbine 20 arranged in the exhaust passageway 12, a compressor 22 arranged in the intake passageway 14, and a rotating shaft 24 connecting the turbine 20 and the compressor 22. The second stage turbocharger 18 having a small volume is located adjacent to the engine and comprises a turbine 26 arranged in the exhaust passageway 12, a compressor 28 arranged in the intake passageway 14, and a rotating shaft 30 connecting the turbine 26 and the compressor 28. The turbine 20 of the large volume turbocharger 16 is located downstream of the turbine 26 of the small volume turbocharger 18 in the direction of the flow of the exhaust gas, as shown by arrows f1. The compressor 22 of the large volume turbocharger 16 is located upstream of the compressor 28 of the small volume turbocharger 18 in the direction of the flow of intake air, as shown by arrows f2. An intercooler 32 is arranged in the intake passageway 14 downstream of the compressor 28 of the small volume turbocharger 18.

A first exhaust bypass passageway 34 is connected to the exhaust passageway 12 to bypass the turbine 20 of the large volume turbocharger 16, and a first exhaust bypass butterfly type control valve 36 is arranged in the bypass passageway 34. This bypass control valve 36 is connected to a first vacuum actuator 38 for controlling the intake pressure P5 downstream of the compressor 22 of the large volume turbocharger 16. The first vacuum actuator 38 is provided with a diaphragm 38a connected to the bypass control valve 36, and a spring 38b urging the diaphragm 38b so that the bypass passageway 34 is normally closed by the bypass control valve 36. The actuator 38 further has a pressure chamber 38c on one side of the diaphragm 38a and connected, via a pipe 39, to the intake passageway 14 downstream of the compressor 22 of the large volume turbocharger 16. When the pressure of the intake pipe 14 downstream of the compressor 22 of the large volume turbocharger 16 reaches a predetermined value, the diaphragm 38a is moved against the force of the spring 38b, whereby the bypass control valve 36 is opened, and as a result, the intake pressure P5 downstream of the compressor 22 of the large volume turbocharger 16 is controlled to a predetermined value.

A second bypass passageway 40 is connected to the exhaust passageway 12 to bypass the turbine 26 of the small volume turbocharger 18, and a second butterfly type bypass control valve 42 is arranged in the bypass passageway 40. The bypass control valve 42 is connected to a second actuator 44 which, as will be made clear later, is responsive to the pressure P5 of the intake passageway downstream of the compressor 22 of the first large volume turbocharger 16 and to the pressure P6 of the intake passageway downstream of the compressor 28 of the second small volume turbocharger 18, to open the second bypass passageway 40 when the values of these pressures P5 and P6 are equal. The construction of the second actuator 44 will be fully described later.

An intake bypass passageway 46 is connected to the intake passageway 14, to bypass the compressor 28 of the second stage small volume turbocharger 18, and an intake bypass poppet-type valve 48 is arranged in the third bypass passageway 46 and faces a valve seat 47. The intake bypass valve 48 is connected to an actuator 50 for opening the intake control valve 48 to prevent a pumping loss created by the second stage small volume turbocharger 18 after the first stage large volume turbocharger 16 is in full operation. The third actuator 50 has a diaphragm 50a connected to the intake bypass valve 48 and a spring 50b urging the diaphragm 50a so that the bypass passageway 46 is usually closed by the intake bypass valve 48. The actuator 50 further has a first pressure chamber 50c on one side of the diaphragm 50a away from the valve 48, and connected to the intake passageway 14 downstream of the compressor 28 of the small volume turbocharger 28, and a second pressure chamber 50d on the other side of the diaphragm 50a near the valve 48.

To control the intake bypass control valve 48, a first electromagnetic three-way valve 52 and a second electromagnetic three-way valve 54 are provided. The first three-way valve 52 is switched between a de-energized position at which the diaphragm chamber 50c is opened to an atmospheric pressure source 56 such as an air filter, and an energized position at which the chamber 50c is connected to the intake passageway 14 downstream of the compressor 28 of the second stage small volume turbocharger 18. The second three-way valve 54 is switched between a de-energized position at which the second diaphragm chamber 50d is opened to an atmospheric pressure source 58 or a vacuum pressure source such as a vacuum pump usually provided for a diesel engine, and an energized position at which the second diaphragm chamber 50d is connected to the intake passageway 14 downstream of the compressor 28 of the second stage small volume turbocharger 18. An electric control unit 56 is connected to the first and second three-way valves 52 and 54 for controlling the operation of these valves 52 and 54.

Figure 2:
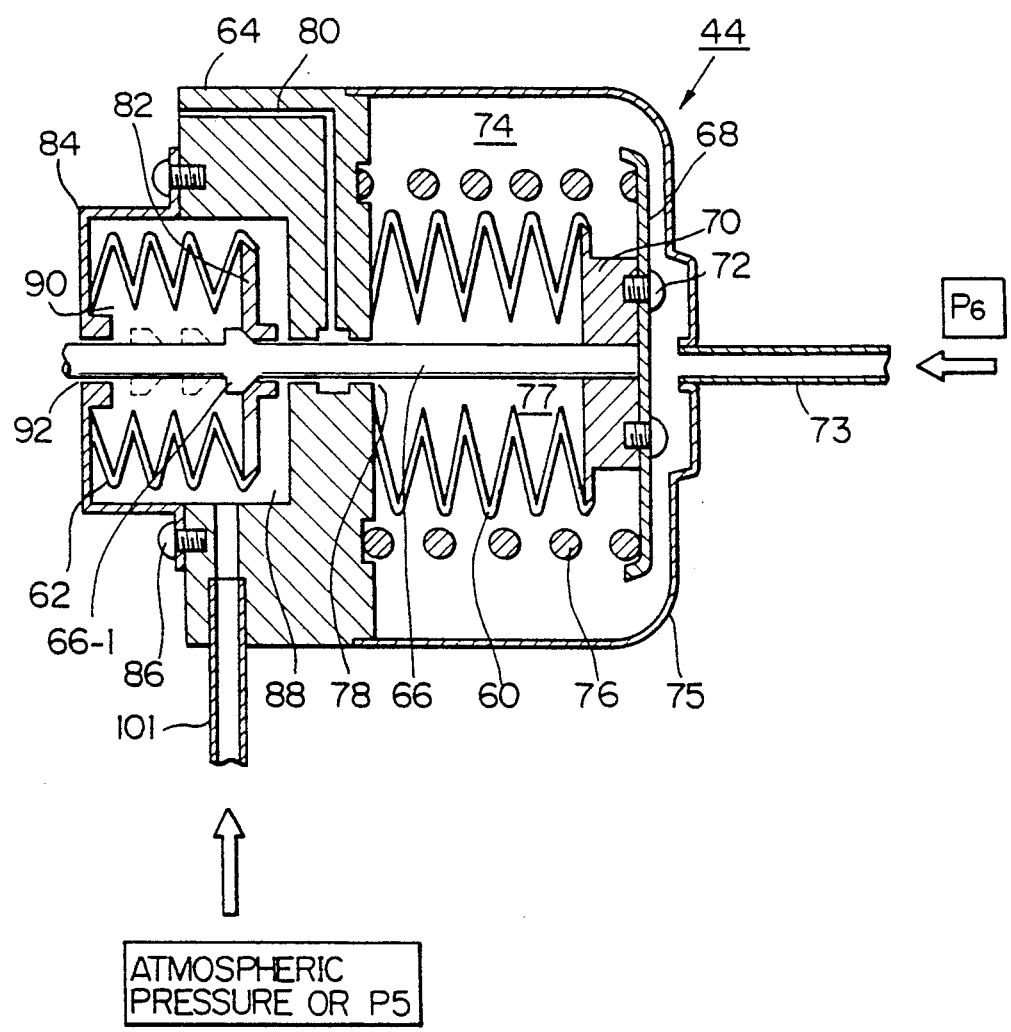
FIG. 2 is a cross-sectional view of the actuator in FIG. 1.

FIG. 2 shows the details of the second actuator 44 for operating the exhaust bypass control valve 42. The actuator 44 includes a first bellows 60 and a second bellows 62, which are made from heat resistant material such as metal. The actuator 44 further includes a base member 64 through which a connecting member such as rod 66 is freely inserted. One end of the rod 66 is connected to a plate 68 connected to a bellows holder 70 by screws 72, and the holder 70 is fixedly connected to one end of the bellows 60. The other end of the bellows 60 is in contact with and connected to the base plate 64. The other end of the rod 66, as shown in FIG. 1, is connected to the exhaust gas bypass control valve 42. A control chamber 74 is formed between the cover 75 and the bellows 60, and a coil spring 76 is arranged in the chamber 74 so that the rod 66 is urged to close the valve 42. The chamber 74 is connected by a conduit 73 to the intake passageway 14 downstream of the compressor 28 of the small volume turbocharger 18, as shown in FIG. 1. A chamber 77 is formed inside the bellows 60 connected to the atmosphere via a slit 78 and a passageway 80 in the base member 64. One end of the second bellows 62 is fixedly connected to a plate 82 through which the rod 66 freely passes, and the other end of the second bellows 62 is in contact with and connected to a cap member 84 fixedly connected to the base member 64 by screws 86. A second control chamber 88 is formed between the bellows 62, cap 84, and the base 64, and the pressure of this chamber 88 is controlled as described hereinafter. An atmospheric pressure chamber 90 open to the atmosphere via a slit 92 is formed inside the bellows member 62. The rod 66 has a substantially annular projection 66-1 in contact at one side with the end plate 82 of the bellows 62.

As shown in FIG. 1, a third electromagnetic three-way valve 100 is provided and is switched between a de-energized position at which the control chamber 88 of the actuator 44 is connected to the atmospheric pressure source 102 such as an air filter, and an energized position at which the control chamber 88 is connected, via a conduit 101, to the intake passageway 14 downstream of the compressor 22 of the large volume turbocharger 16. The electromagnetic valve 100 is electrically connected to the control circuit 56.

The control circuit 56 controls the switching operation of the electromagnetic valves 52, 54 and 100, to obtain a desired operation of the two turbochargers 16 and 18. A pressure difference transducer 103 connected to the control circuit 56 has a first pressure signal input connected to the engine intake pipe downstream of the compressor 22 of the large volume turbocharger 16 and a second pressure signal input connected to the engine intake pipe downstream of the compressor 28 of the small volume turbocharger 18. The pressure difference transducer 103 has an electric signal output connected to the control circuit 56, and the electrical state of the output of the transducer 103 is, for example, "low" when the pressure P6 downstream of the compressor 28 of the small volume turbocharger 18 is higher than the pressure P5 downstream of the compressor 22 of the large volume turbocharger 16. The output of the transducer 103 becomes "high" when the pressure P6 downstream of the compressor 28 of the small volume turbocharger 18 and the pressure P5 downstream of the compressor 22 of the large volume turbocharger 16 are equal.

The operation of the first embodiment shown in FIGS. 1 and 2 will be described. When the engine speed is low, the first three-way valve 52 is energized and the upper diaphragm chamber 50c of the actuator 50 is opened to the pressure P6 in the intake passageway 14 downstream of the compressor 28 of the small volume turbocharger 18. The second three-way valve 54 is de-energized so that the lower bellows chamber 50d is opened to the atmospheric pressure source, or preferably the vacuum pressure source 58, so that the exhaust bypass valve 48 is moved downward by the force of the spring 50b. The positive pressure P6 in the upper chamber 50b and the atmospheric pressure or negative pressure in the lower chamber 50d ensure that the valve 48 is firmly seated on a valve seat 47, and virtually eliminate any possible leakage of intake air between the valve member 48 and valve seat 47. When the engine is in the low speed condition, the third three-way valve 100 is de-energized and the control chamber 88 is opened to the atmospheric pressure source 102. The pressure P6 in the intake passageway 12 downstream of the compressor 28 of the small volume turbocharger 18 is opened to the control chamber 74 of the actuator 44. In a low engine speed condition, however, the value of the pressure P6 is not high enough to move the bellows 60 against the spring 60, and as a result, the exhaust bypass control valve 42 remains closed. Furthermore, in the low speed condition, the pressure P5 of the intake system downstream of the compressor 22 of the large volume turbocharger 16 is also low, so that the actuator 38 holds the first exhaust bypass valve 36 in the closed position.

Figure 4:
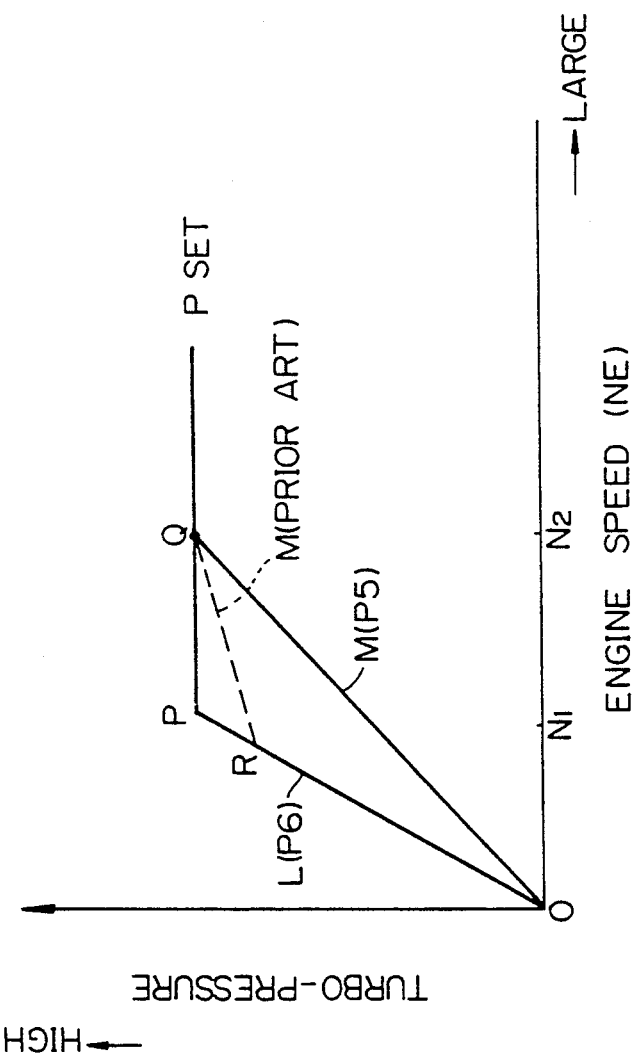
FIG. 4 is a graph showing the relationship between the engine speed and intake pressure.

When the engine speed is increased, the pressure P6 at the output of the compressor 28 of the small volume turbocharger 18 is quickly raised, as shown by the line L in FIG. 4, but the pressure P5 at the output of the compressor 22 of the large turbocharger is slowly raised, as shown by line M in FIG. 4. Accordingly, when the engine is in a low speed condition, the contribution of the small volume turbocharger 18 to the total supercharging effect is greater than that of the large volume turbocharger 16.

Figure 3:
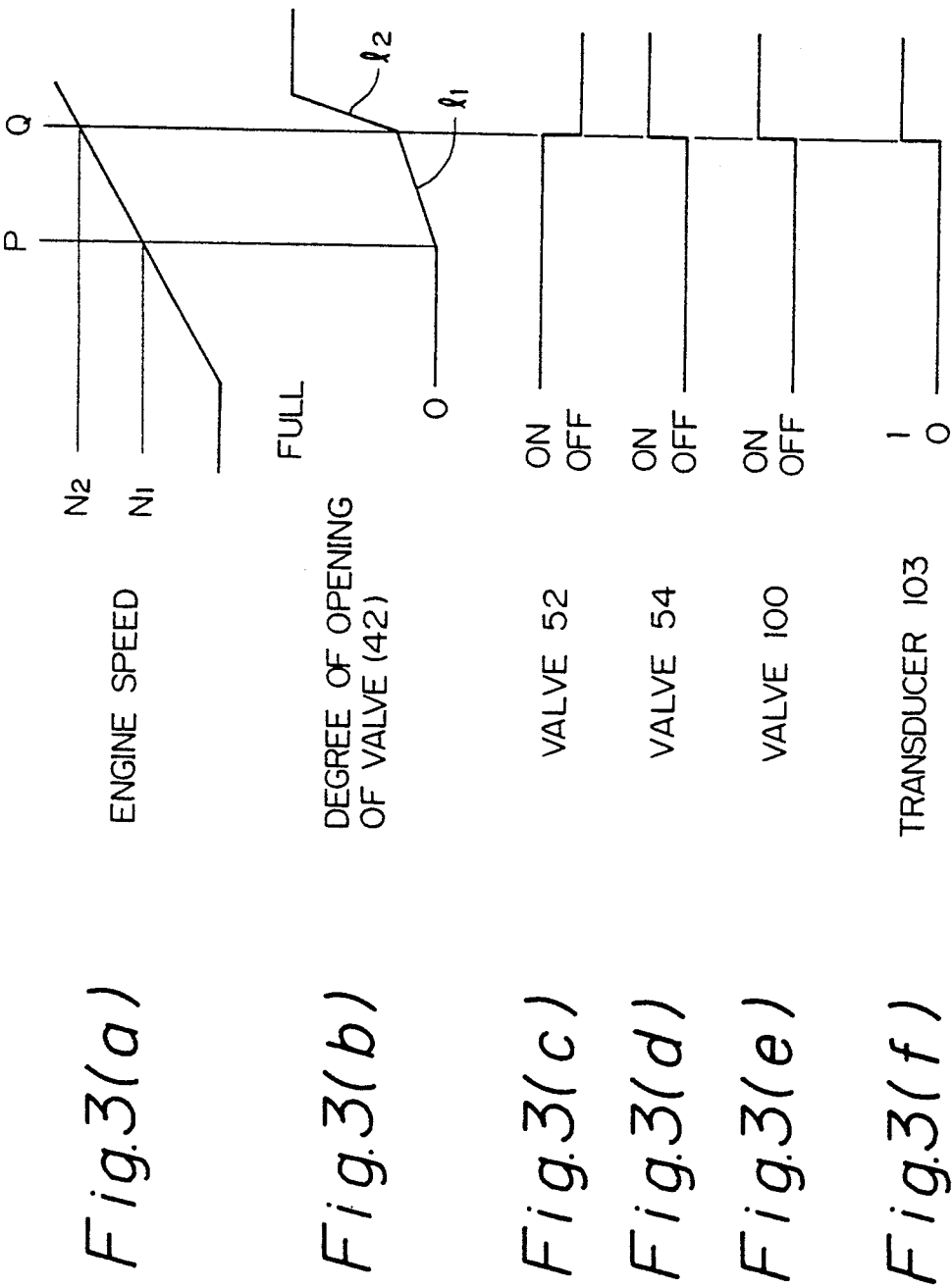
FIG. 3(a) to 3(f) are timing charts showing the operation of the embodiment of FIG. 1.

When the engine speed is increased so that the pressure P6 at the control chamber 74 of the actuator 44 is sufficient to cause the bellows 60 to be displaced against the force of the spring 76, the exhaust bypass valve 42 is moved in the counterclockwise direction so that the bypass passageway 40 is opened. This point of the engine speed at which the exhaust bypass valve 42 starts to open is called the "intercept point", as designated by P in FIGS. 3 and 4. The pressure P6 increase more gradually with increasing engine speed after the intercept point P is reached, because the exhaust bypass control valve 42 is opened wider by the bellows 60 in accordance with a further increase in the engine speed.

As this stage of the operation of the actuator 44, as explained above, only the first control chamber 74 is opened to the supercharging pressure, and the second control chamber 88 is opened to the atmospheric pressure. Accordingly, the second bellows 62 is fully extended, whereby the engaging plate 82 is moved away from the stopper portion 66-1 of the rod 66. As a result, the bellows 60 is moved only by the pressure P6 in the chamber 74, and accordingly, a relatively small rate of movement of the rod 66 with increasing engine speed is obtained. Namely, the exhaust bypass valve 42 is gradually opened as engine speed increases after the intercept point P is reached, as shown by line $l_1$ in FIG. 3(b).

When the engine speed is increased to a point corresponding to Q in FIG. 4, the pressure P5 downstream of the large volume turbocharger 16 becomes equal to the pressure P6, which has been controlled since the engine speed reached point P to a relatively constant value by the exhaust bypass valve 42 through the actuator 44. When P5 equals P6, transducer 103 outputs a "high" signal as shown in FIG. 3(f), causing the control circuit 56 to output signals to de-energize first electromagnetic valve 52 (FIG. 3(c)) so that the upper chamber 50c of the actuator 50 is opened to the atmosphere to energize the second electromagnetic valve 54 (FIG. 3(d)) so that the lower chamber 50d is opened to the intake pressure P5 downstream of the compressor 22 of the large volume turbocharger 16. As a result, the diaphragm 50a is moved upward against the force of the spring 50b to move the intake bypass valve 48 away from the valve seat 47, and accordingly, a substantial part of the intake air from the compressor 22 of the large volume turbocharger 16 is introduced into the bypass passageway 46. At the same time, the control circuit 56 outputs a signal to energize the third electromagnetic valve 100 (FIG. 3(e)), so that the pressure P5 is applied to the second control chamber 88 of the actuator 44 and the bellows 62 is moved, whereby the engaging plate 82 is moved to engage the projection 66-1, and thus the rod 66 is moved to open the exhaust bypass control valve 42. Namely, in this case, a force corresponding to the pressure P6 in the first chamber 74 plus a force corresponding to the pressure P5 in the second chamber 88 is applied to the rod 66 against the force of the spring, and as a result, the force applied to the rod 66 is increased with respect to that needed for a low speed condition, wherein only a force corresponding to the pressure P6 in the chamber 74 is applied. Due to the doubling of the force urging the rod 66 to open the exhaust bypass control valve 42, the exhaust bypass valve 42 is very quickly opened after the point Q is reached, as shown by a line $l_2$ in FIG. 3(b). Note, at the point Q, the actuator 38 starts to open the valve 36 so that the pressure P5 also is controlled to Pset, as determined by the spring 38b.

In the prior art actuator, the exhaust gas bypass valve has only a single step opening characteristic whereby only a particular rate of opening of the exhaust bypass valve as a function of increasing engine speed is obtained. A desired characteristic of the exhaust bypass valve 42 is such that the actuator 44 holds the valve 42 fully closed until the pressure P6 reaches the predetermined set pressure Pset (FIG. 4), and that the actuator allows the valve 42 to quickly reach its full stroke as engine speed increases after this set value is reached. In the prior art, however, only one actuating stage is used, and thus the pressure P6 at the point R at which the valve begins to open (intercept point) must be lower than the P set value. The pressure P6 only gradually increases to the Pset pressure as shown by the dashed line M in FIG. 4 as the engine speed is increased, and the bypass valve 42 reaches its full stroke position. Therefore, the prior art suffers from a drawback in that a desired turbo efficiency cannot be obtained. If the single stage spring in the prior art is set to have a value which allows the valve 42 to begin to open at point P, it is difficult for the valve to reach its full stroke at the point Q, and as a result, the small volume turbocharger is operated at an unnecessarily high rotational speed at engine speeds in the region above the point Q, and therefore, the fuel consumption efficiency is lowered.

In contrast, the actuator 44 according to the present invention effects a two stage opening of the valve 42. When the engine speed is low, i.e., P6 is larger than P5, only the force of P6 is applied to the rod 66 via the first control chamber 74, so that spring 76 can overcome the force applied, and the actuator 44 keeps the valve 42 closes until the set pressure value Pset is reached, to obtain a higher intercept point. When the engine speed increases to the point where the pressure P5 becomes equal to P6, the pressure P5 is introduced into the second control chamber 62, which doubles the force acting to move the rod 66 in the valve opening direction and allows the valve to quickly reach its full stroke while maintaining the intake pressure close to the set pressure Pset.

Figure 5:
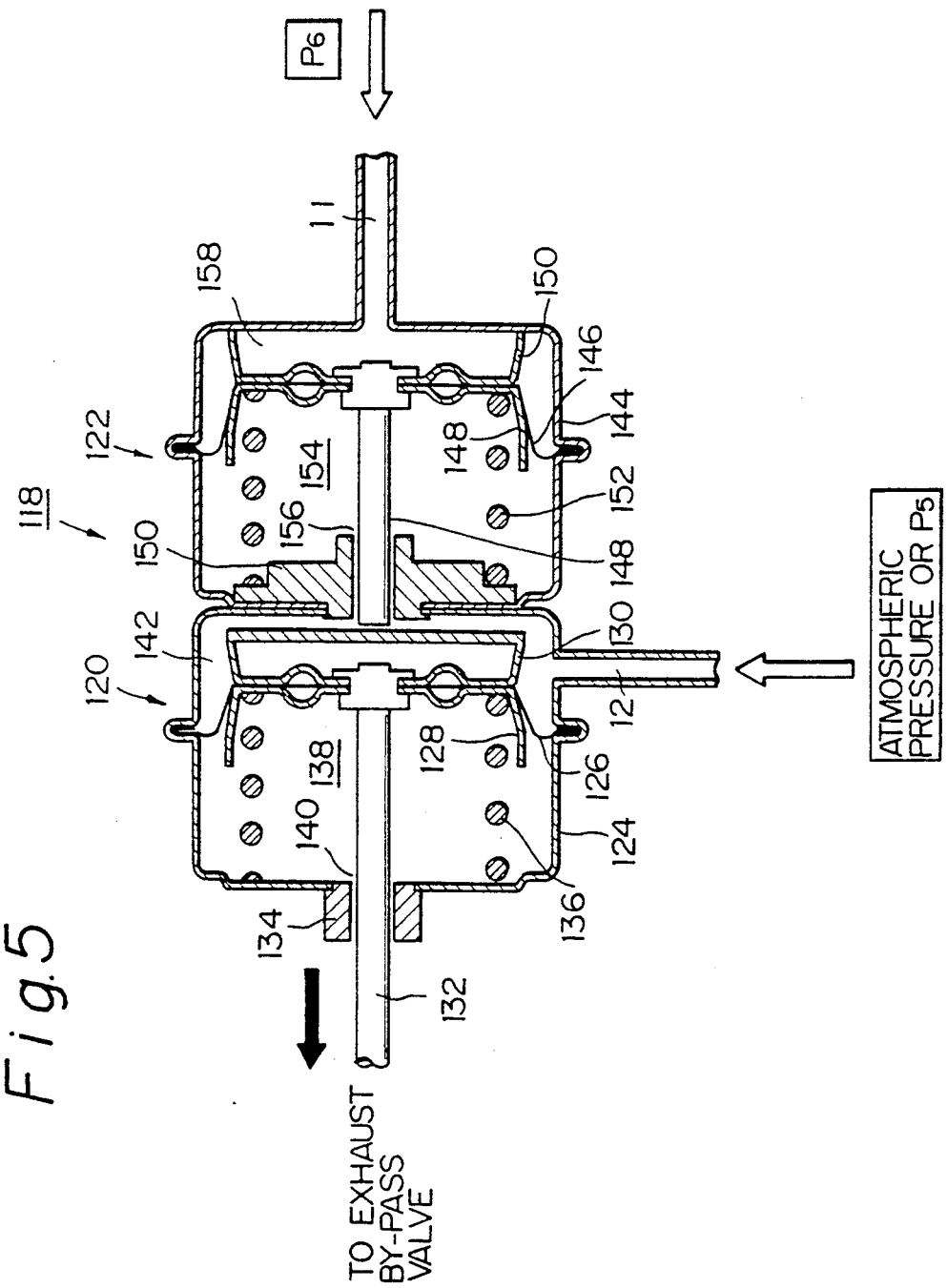
FIGS. 5 to 10 show various embodiments of the actuator in accordance with the present invention.

FIG. 5 shows a second embodiment of an actuator for operating the exhaust bypass valve (42 in FIG. 1) arranged in a bypass passageway (40 in FIG. 1) bypassing the turbine 26 of the small volume turbocharger (18 in FIG. 1). As shown in FIG. 5, the actuator 118 includes a first diaphragm unit 120 and a second diaphragm unit 122. The second diaphragm unit 120 is provided with a casing 124, a diaphragm 126 arranged across the interior of the casing 124, a pair of diaphragm plates 128 and 130 sandwiching the diaphragm 126 therebetween, a rod 132 having a first end connected to the diaphragm 126 and a second end connected to the exhaust bypass control valve (42 in FIG. 1), a guide 134 for the rod 132, and a spring 136 urging the diaphragm 126 to close the exhaust bypass control valve (42 in FIG. 1). The first unit 120 forms a chamber 138 on one side of the diaphragm 126 open to the atmosphere via a slit 140, and a chamber 142 on the other side of the diaphragm 126. The second diaphragm unit 122 is provided with a casing 144, a diaphragm 146 arranged across the interior of the casing 144, a pair of diaphragm plates 148 and 149 sandwiching the diaphragm 146 therebetween, a rod 150 having a first end connected to the diaphragm 146 and a second end in contact with the diaphragm plate 130 of the first unit 120, a guide 151, and a spring 152 urging the diaphragm 146 to move the rod 150 away from the first unit 120. The second unit 122 forms a chamber 154 on one side of the diaphragm 146, which communicates with the chamber 142 of the first unit 120 via a slit 156, and a chamber 158 on the other side of the diaphragm 146. The chamber 158 as a first control chamber is open to the intake pressure P6 in the intake passageway downstream of the compressor (28 in FIG. 1) of the small volume turbocharger (18 in FIG. 1), and the chamber 142 as a second control chamber is selectively opened to the atmosphere or to the intake pressure P5 downstream of the compressor (22 in FIG. 1) of the large volume turbocharger (16 in FIG. 1).

In the operation of the second embodiment, when the engine is in a low speed condition, as in the first embodiment, the second control chamber 142 is opened to the atmospheric pressure, and therefore, the spring 136 displaces the diaphragm 126 so that the plate 130 comes into contact with the rod 150, and as a result, not only a force generated by the spring 152 but also a force generated by the spring 136 is applied to the diaphragm 146. Namely, a force generated by the pressure P6 in the first control chamber 158 is opposed by a force of both of the springs 136 and 152 proportional to k1 plus k2, which are the spring coefficients of the springs 136 and 152, respectively. Accordingly, the exhaust bypass control valve (42 in FIG. 1) is gradually opened as shown by line $l_1$ in FIG. 3(b) in the first embodiment, against the combined forces of the springs 136 and 152 as the engine speed increases after the intercept point is reached.

When the pressure P5 becomes equal to the pressure P6, the chamber 142 is opened to the pressure P5 and the movement of the rod 132 in the direction for opening the exhaust bypass control valve (42 in FIG. 1) is opposed only by the spring 136, since the engaging plate 130 is separated from the rod 148 of the second unit 122. Accordingly, the pressure P5 is able to move the diaphragm 126 against the weaker force of the spring 136, and thus the exhaust bypass control valve (42 in FIG. 1) is moved quickly to the full stroke position, as shown by line $l_2$ in FIG. 3(b) in the first embodiment, and as a result, a desirable characteristic of the turbo pressure can be obtained by the actuator 118 in this second embodiment.

Figure 6:
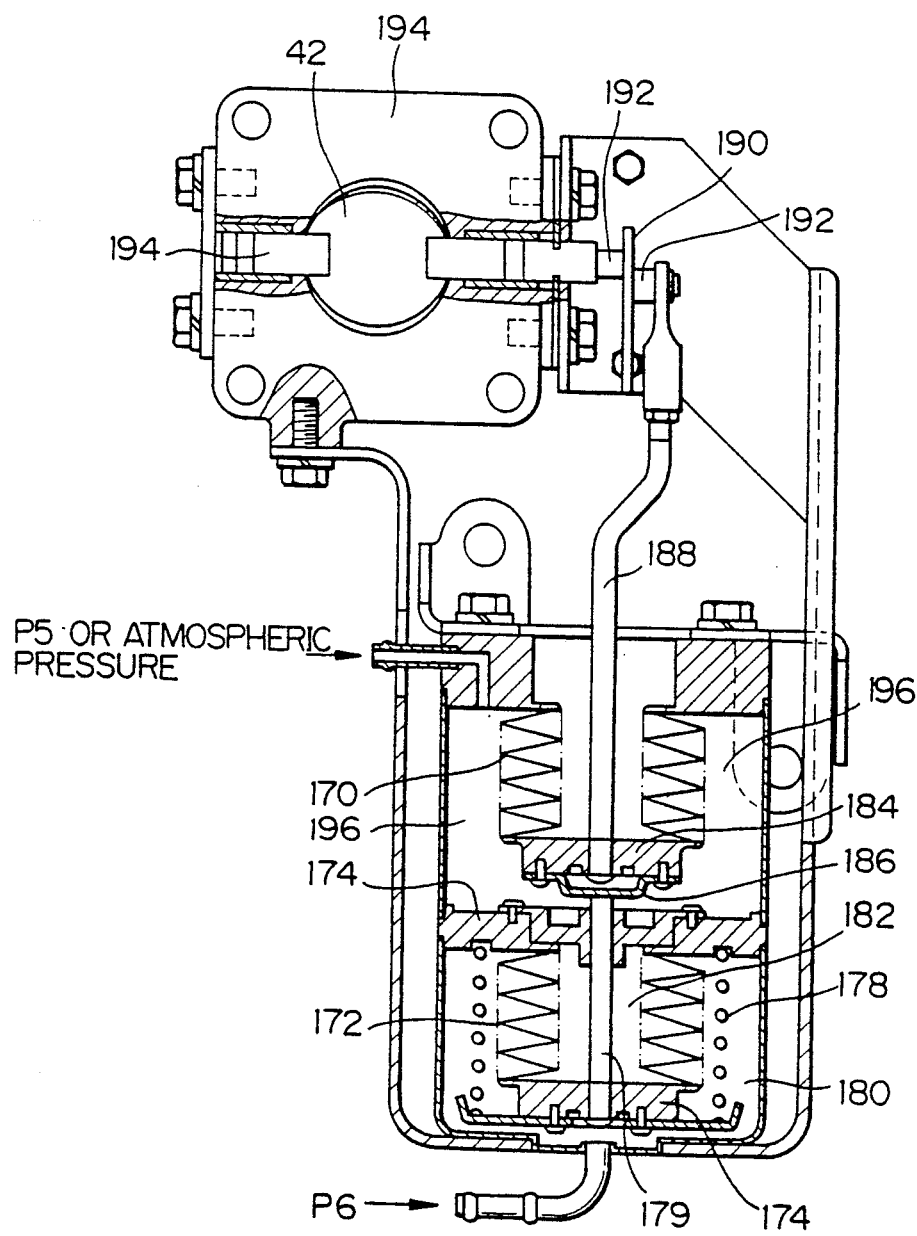

FIG. 6 shows a third embodiment which is slightly changed with respect to that of FIG. 5. In this embodiment, the diaphragms are replaced by bellows 170 and 172. FIG. 6 also shows a detailed construction of the exhaust gas bypass control valve 42. The bellows 172 has one end connected to an intermediate stationary plate 174 and a second end connected to an end plate 176 which is urged downward by a spring 178. A rod 179 is also connected to the end plate 176. A first control chamber 180 outside of the bellows 172 is open to the intake pressure P6 downstream of the compressor (28 in FIG. 1) of the second stage small volume turbocharger 18, and the chamber 182 is open to the atmosphere. The other bellows 170 has one end connected to an end plate 184, to which an engaging plate 186 is connected and with which the upper end of the rod 179 is in contact. To urge the engaging plate 186 into contact with the rod 179, the bellows 170 made from a metal has an elasticity by which the plate 186 is urged downward in FIG. 6. A spring may be provided in place of or in addition to the elasticity of the bellows 170. The end plate 184 is connected to a lower end of a rod 188, and the upper end of the rod 188 is connected to a lever 190 by a pin 192. The lever 190 has a shaft 192 connected to a shaft 193 of the exhaust bypass valve 42, as schematically shown in FIG. 1, and the valve 42 is arranged in a valve body 194. A second control chamber 196 is formed around the bellows 170, and is selectively connected to the atmosphere or the intake pressure P5 downstream of the compressor (22 in FIG. 1) of the large volume turbocharger (16 in FIG. 1).

The operation of the actuator shown in FIG. 6 is similar to that of the actuator of FIG. 5 in that, when the engine speed is low, the chamber 196 outside the bellows 170 is opened to the atmospheric pressure, whereby the bottom end of the bellows member 170 is moved downward by its own elasticity, and accordingly, the force generated by the pressure in the first control chamber 180 is opposed not only by the force of the spring 178 but also by the force of the elasticity of the bellows 170. As a result, a large spring force corresponding to the spring coefficient of the spring 178 plus spring coefficient of the bellows 170 opposes the pressure in the first control chamber 180, and thus the bypass control valve 42 connected to the rod 188 is opened only gradually in accordance with the increase of the pressure P6 with increasing engine speed, after the intercept point P is reached, as shown by line $l_1$ in FIG. 3(b) in the first embodiment. When the values of the pressures P6 and P5 are equal, the pressure P5 is introduced into the second control chamber 196, causing the bottom end of the bellows 170 to move upward against its own elastic force, and accordingly, the plate 186 is urged away from the upper end of the rod 179. Therefore, the opening of the exhaust bypass control valve 42 is opposed only by the spring force of the bellows 170 to which the pressure P5 in the second control chamber 196 is applied. Thus the force opposed to the pressure force in the chamber 196 is reduced, whereby the movement of the rod 188 connected to the bellows 170 via the rod 188 is increased accordingly, the valve member 42 is quickly opened as the engine speed increases, as shown by line $l_2$ in FIG. 3(b) in the first embodiment.

Figure 7:
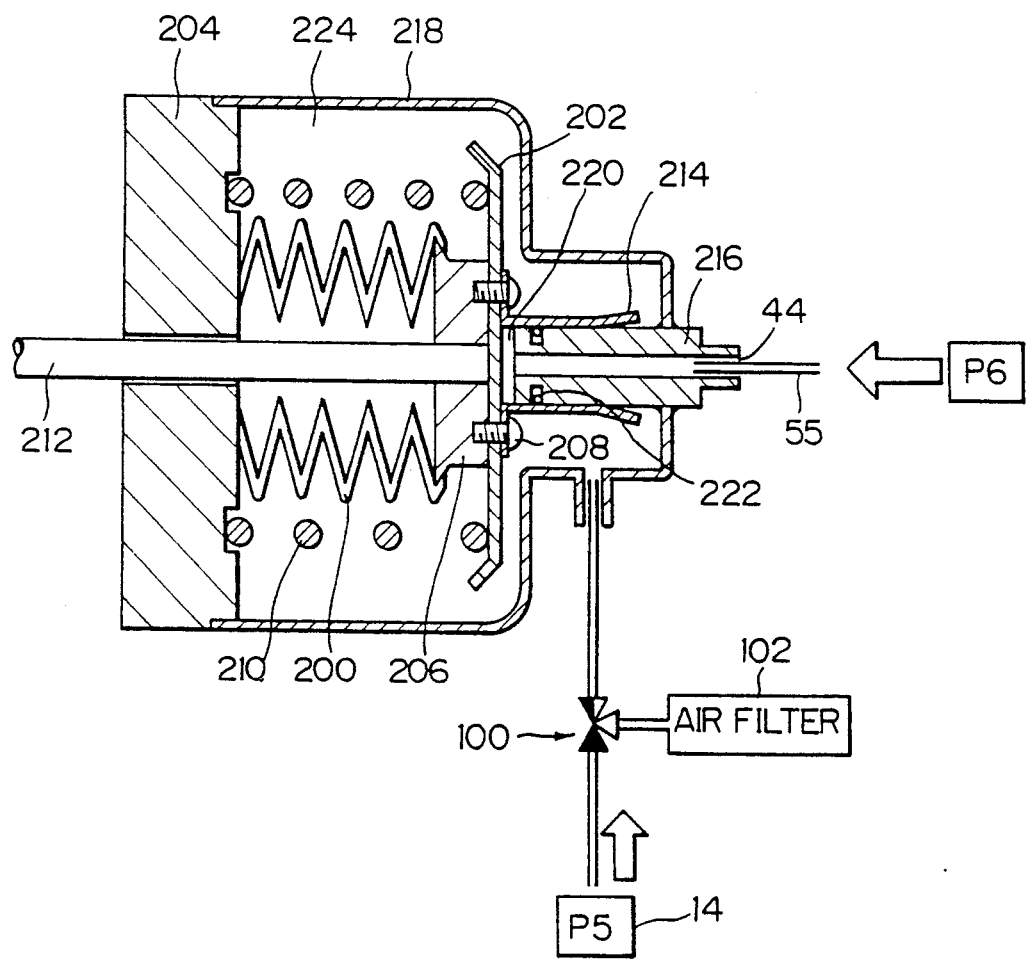

In an embodiment shown in FIG. 7, only a single bellows 200 and a diaphragm plate 202 are employed, and a means is provided on the diaphragm plate 202 for obtaining thereon two pressure-receiving portions having different areas, so that the available force for opening of the exhaust bypass valve is varied. The single bellows member 200 has a first end connected to a base 204 and a second end connected to a moving plate 206 connected to the diaphragm plate 202 by screws 208. A spring 210 is provided for urging the diaphragm plate 202 away from the base plate 204. A rod 212 has a first end connected to the diaphragm plate 202 and a second end (not shown) connected to the exhaust bypass control valve (42 in FIG. 1). A tubular guide member 214 has a first end defining an annular flange connected to the diaphragm plate 202 by screws 208. The tubular member 214 is slidable with respect to a hollow rod member 216 connected to an actuator casing 218, and a first control chamber 220 is formed between the diaphragm plate 202, the tubular member 214, and the rod 216. The rod 216 has an axial hole having a first end connected to the engine intake pipe downstream of the second small volume turbocharger (18 in FIG. 1) and a second end open to the first control chamber 220. Accordingly, the first control chamber 220 is subjected to the pressure P6. An O-ring 222 is provided to obtain an air-tight seal of the first control chamber 220.

A second control chamber 224 is formed between the bellows 200, the plate 202, tube 214 and the rod 216, and is selectively switched between the atmospheric pressure source 102, e.g., an air filter, and the intake pipe 14 having a pressure P5 downstream of the first stage large volume turbocharger (16 in FIG. 1).

In the operation of the embodiment of FIG. 7, when the engine speed is low, the electro-magnetic three-way valve 100 is positioned so that the second control chamber 224 is opened to the atmospheric pressure source 102, and as a result, only the pressure P6 in the first control chamber 220 of the first pressure receiving area is applied to the diaphragm plate 202, to displace the bellows 200. In this case, the force is determined as a product of the pressure P6 and the circular area of the plate 202 subjected to the pressure P6, and accordingly, the movement of the diaphragm plate 202 against the force of the spring 210 is small as engine speed increases after the intercept point (A in FIG. 4) is reached. As a result, the exhaust gas bypass valve 42 is gradually opened, as shown by the line 1$l$ in FIG. 3($b$) in the first embodiment, after the intercept point is reached, to maintain the preset turbocharged pressure (Pset in FIG. 4).

When the pressure P5 of the first stage large volume turbocharger (16 in FIG. 1) is equal to the pressure P6 of the second stage low volume turbocharger (18 in FIG. 1) at the point Q in FIG. 4, the three-way valve 100 is switched and the pressure P5 is introduced into the second control chamber 224. In this case, not only the force of the pressure P6 in the first chamber 220 but also a second force of the pressure P5 in the second chamber 224 is applied to the diaphragm plate 202, to move it against the force of the spring 210. This second force is a product of the pressure P6 and the annular area of the diaphragm subjected to the pressure P5. Accordingly, the displacement of the bellows 200 against the force of the spring 200 is increased, and thus the exhaust bypass valve 42 is quickly opened to its full stroke, as shown by the line $l_2$ in FIG. 3($b$) in the first embodiment.

Figure 8:
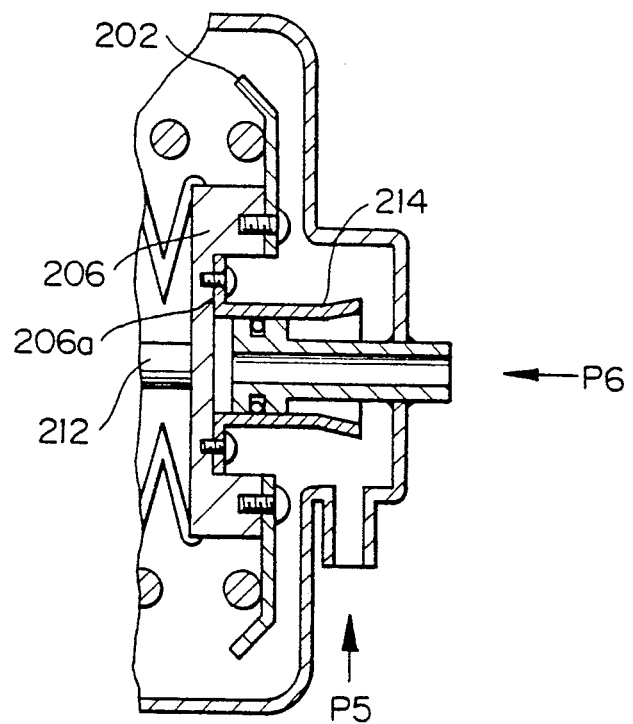

In FIG. 8, which is a modification of the embodiment of FIG. 7, the diaphragm plate 202 has an annular shape, and the plate 206 has a recess 206$a$ having a bottom end on which the tubular guide member 214 rests and is connected to the plate 206. This embodiment allows a lowering of a constraint force applied vertically to the guide member 214 when moved axially, and thus, a smooth movement of the rod 212 can be always obtained regardless of any misalignment of the link system of the exhaust bypass control valve.

Figure 9:
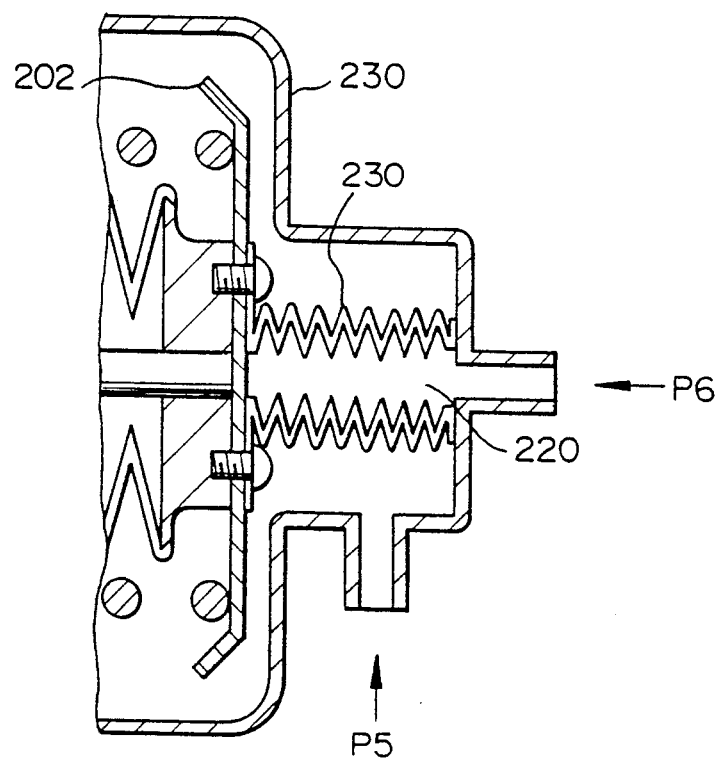

FIG. 9 also shows a modification of the embodiment of FIG. 7, wherein the guide tube 214 and guide rod 216 in FIG. 7 are replaced by a second bellows 230 having a first end connected to the diaphragm plate 202 and a second end connected to the inner surface of the actuator casing 218. In this embodiment, the first control chamber 220 is formed inside the second bellows 230. This modification is advantageous in that the O-ring 220 in FIG. 7 can be omitted, and the precision requirements in the embodiment in FIG. 7 are eased, since the guide tube 214 and guide rod 216 are omitted. Furthermore, the provision of the second bellows 230 instead of the tube and rod minimizes the restraint force applied to the flange member 202 in the direction transverse to the movement of the flange, and as a result, a smooth movement of the link system connecting the diaphragm plate 202 to the valve 42 is obtained regardless of inevitable movement or misalignment of the portion connecting the rod 212 to the valve (42 in FIG. 1).

Figure 10:
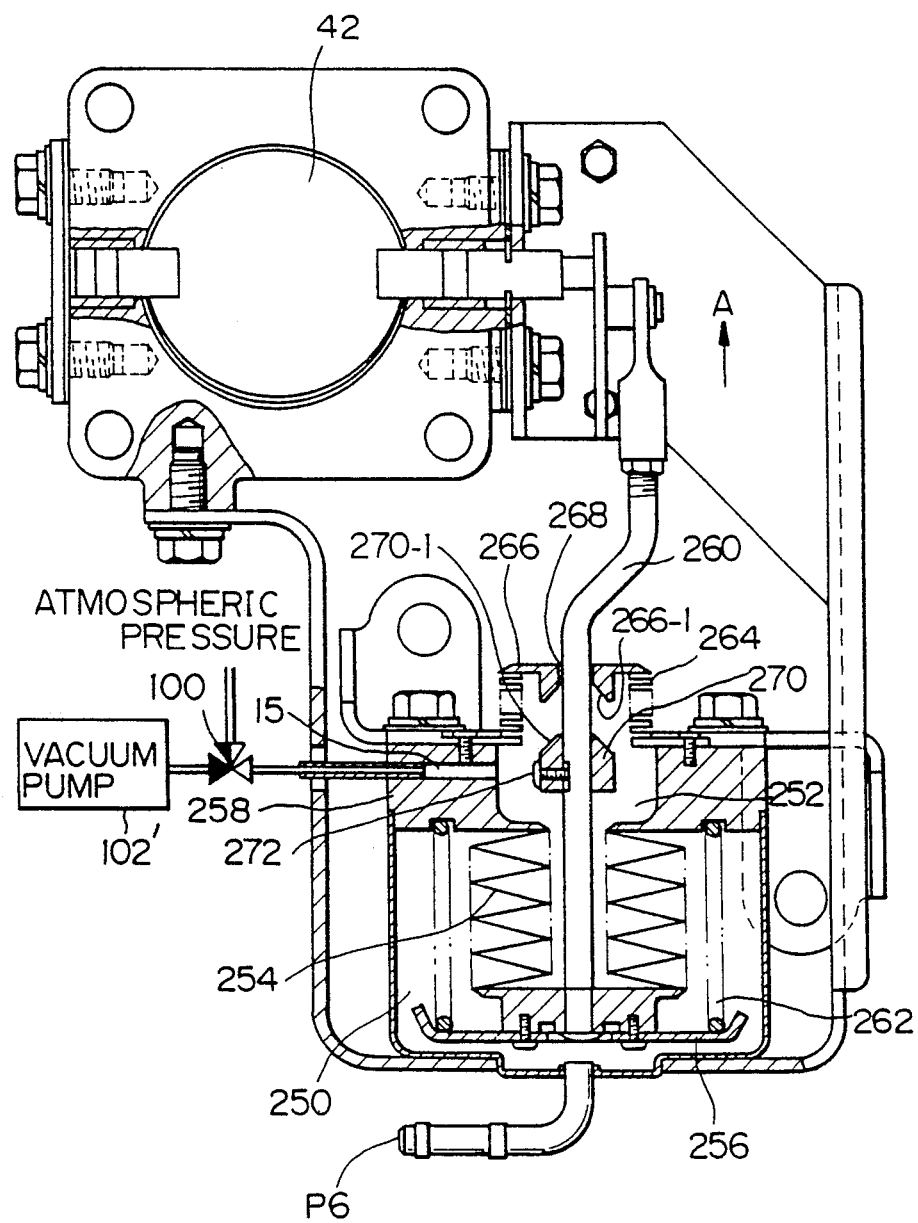

FIG. 10 shows another embodiment wherein a means is provided for changing the pressure difference between the first and second chambers 250 and 252, to control the degree opening of the exhaust bypass valve 42. In this embodiment, the engine must be provided with a vacuum pressure source 102'. As shown in FIG. 10, a first bellows 254 has a first end connected to the flange plate 256 and a second end connected to a base 258. The flange plate 256 is connected to the shaft of the valve 42 via lever and rod 260, and a spring 262 urges the flange plate 256 downward to close the valve 42. A second bellows 264 is provided having a first end fixedly connected to the end plate 258 and a second end fixedly connected to an end plate 266. The rod 260 freely passes through the end plate 266 so that an annular slit 268 is formed between the rod 260 and the end plate 266. The first chamber 250 is formed outside of the first bellows 254, and is open to the intake pressure P6 downstream of the small volume turbocharger (18 in FIG. 1). The second chamber 252 is formed between the first bellows 254 and the second bellows 266, and a three-way valve 100 selectively connects the second chamber 252 to the vacuum source 102', such as a vacuum pump when the engine is a diesel engine, or to an atmospheric pressure source. The rod 260 is provided thereon with an engaging member 264 having a sleeve shape and fixedly connected to the rod 260 by a set screw 272. The engaging member 270 has a conical upper end surface 270-1 having a shape complementary to a conical end surface 266-1 of the end plate 266 of the second bellows 264. The second bellows 264 is provided with an elasticity which allows the surfaces 266-1 and 270-1 to be usually located apart from each other.

In the operation of the embodiment of FIG. 10, in the engine low speed condition, the first control chamber 250 is opened to the pressure P6 downstream of the second stage small volume turbocharger, and the second chamber 252 is opened to the atmospheric pressure source by the non-energized three-way valve 100. Accordingly, the end plate 266 is moved away from the engaging member 270 by the elasticity of the bellows 264. Only the difference between the pressure P6 in the chamber atmospheric pressure is available to overcome the spring 262 and move the rod 260 in the direction of the arrow to open the valve 42. Therefore, the valve 42 is gradually opened at the initial stage as shown by the line $l_1$ in FIG. 3($b$) in the first embodiment.

When the engine has reached a state wherein the first stage large volume turbocharger (16 in FIG. 1) is fully activated, the three-way valve is switched so that the second chamber 252 is opened to the vacuum source and the bellows 264 is moved downward against the elasticity of the bellows 265, so that the end plate 266 at a surface 266-1 thereof is seated on the engaging member 270 at a surface 270-1 thereof, whereby a pressure difference between the chambers 250 and 252 is increased due to the vacuum in the chamber 252. Thus the increased net pressure acting on the bellows 254 causes the plate 256 to move quickly to its full stroke, as shown by the line $l_2$ in FIG. 3($b$) in the first embodiment.

In the embodiment shown in FIG. 1, an actuator 300 is provided for operating the exhaust bypass control valve 42. This actuator 300 has only one diaphragm 302, a spring 304 urging the diaphragm 302 to close the exhaust bypass control valve 42 and a control chamber 306 on one side of the diaphragm 302 remote from the spring 304. A three-way electro-magnetic valve 308 is switched between an OFF position at which the chamber 306 is open to the atmospheric pressure and an ON position at which the chamber 306 is opened to the pressure P6 downstream of the compressor 28 of the second stage small volume turbocharger 18.

The electromagnetic valve 308 is operated by pulse signals from the control circuit 56, which controls a duty ratio of the pulse signals so that the desired characteristic of the intake pressure as shown by the curve in FIG. 4 is obtained. When the engine speed is low, i.e., the large volume turbocharger is not in full operation, the duty ratio is controlled so that the pressure at the chamber 306 is lower than the pressure P6, and thus the bypass control valve is partially opened. When the engine speed is high and the pressure P5 becomes equal to the pressure P6, the duty ratio is controlled so that the pressure in the chamber 306 is equal to the pressure P6 and thus the control valve 42 is fully opened. As a result, a two-stage characteristic of the opening of the bypass control valve 42 is obtained.

Figure 12:
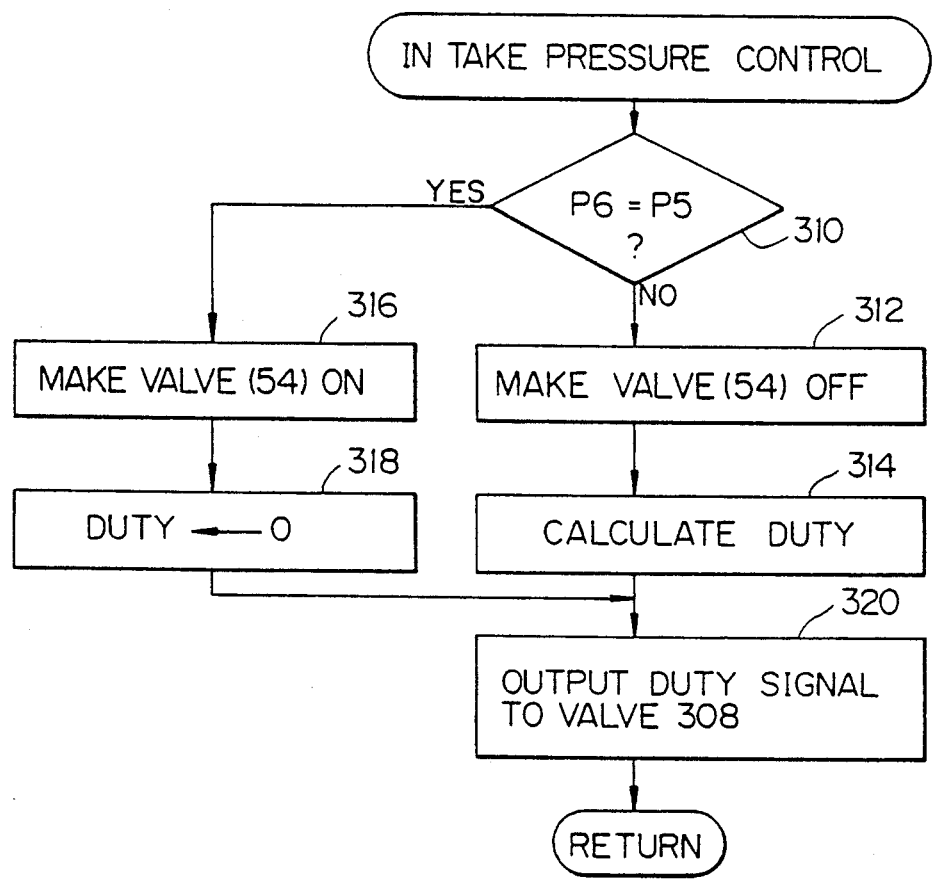
FIG. 12 is a flowchart of the operation of the system of FIG. 11.
Figure 13:
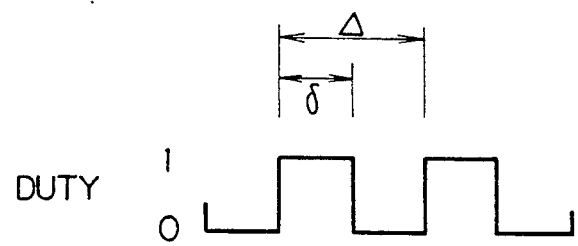
FIG. 13 shows the construction of a duty signal.

FIG. 12 is a flowchart showing the intake pressure control process, including the duty control of the signal for operating the valve 308. At step 310 it is determined whether the pressure P5 downstream of the large volume turbocharger 16 is equal to the pressure P6 downstream of the small volume turbocharger 18. When P5 < P6, i.e., the engine speed is low, the routine goes to step 312, where the valve 54 is made OFF and atmospheric pressure is introduced into the chamber 50d of the actuator 50 to close the valve 48. At step 314, a duty ratio of the pulse signal to be introduced into the control valve 308 is calculated. This duty ratio is a ratio of a duration of a pulse $\delta$ to the duration of one cycle of the signal $\Delta$ in FIG. 13. At step 314, a value of the duty ratio is calculated, so that the pressure in the chamber 306, which is open to the pressure P6, is modified to obtain a characteristic of an increase of the opening speed of the control valve 42, as shown by a line similar to line $l_1$ in FIG. 3(b). As a result, a relatively controlled speed of opening of the valve 42 is obtained between the points P and Q in FIG. 4.

When it is determined that the pressure P5 is equal to the pressure P6, the routine goes to step 316, where the control valve 54 is made ON so that the pressure P5 is applied to the chamber 50d of the actuator 50 to open the intake bypass valve 47. At step 318, zero value is moved into DUTY, so that the chamber 306 of the actuator 300 is always open to the intake line 14 downstream of the small volume turbocharger 18, whereby the pressure in the chamber 306 becomes P6 and is equal to P5. Accordingly, the degree of opening of the valve 42 is increased and the characteristic $l_2$ in FIG. 3(b) is obtained. At step 320, the duty signal calculated at step 320 is output to the control valve 308.

Figure 14:
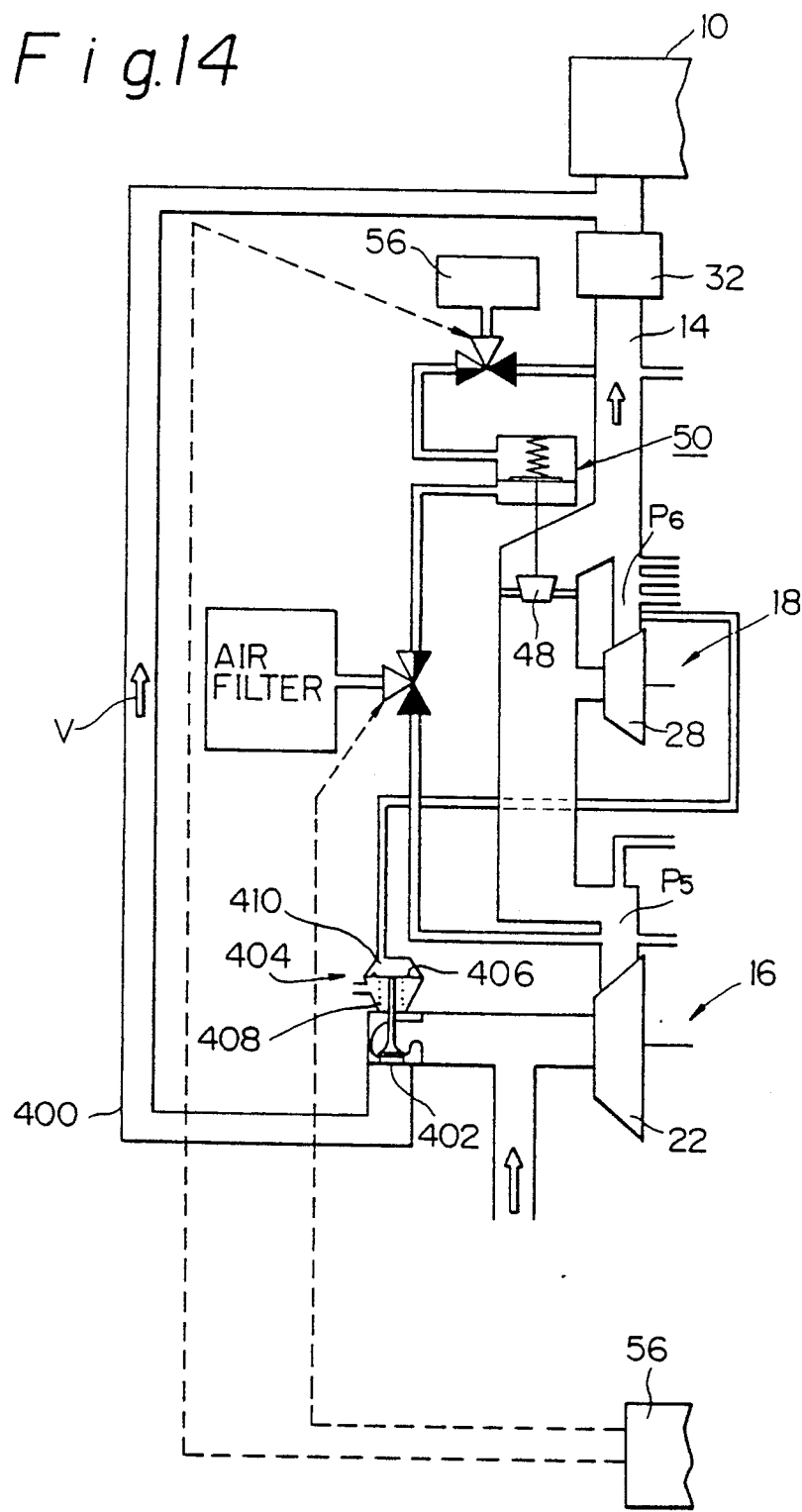
FIG. 14 is a part view of a modification of the system of FIG. 1, wherein an intake bypass control valve is provided to increase the performance of the engine in a low speed condition wherein the turbochargers cannot be operated to the full extent.

FIG. 14 shows a modification of the first embodiment of FIG. 1, by which the performance of the engine is improved during a low speed condition in which the turbochargers 16 and 18 cannot fully carry out the supercharging operations. In this embodiment, an intake bypass passageway 400 is further provided to connect the intake system upstream of the compressor 22 of the first stage large volume turbocharger 16 to the intake system downstream of the intercooler 32. An intake bypass control valve 402 is arranged in the passageway 400 and is connected to an actuator 404, which has a diaphragm 406 connected to the valve 408, a spring 408 urging the diaphragm 406 to open the valve 402, and a chamber 410 open to the pressure P6 downstream of the compressor 28 of the small volume turbocharger 18.

When the engine is in low speed condition in which not only the large volume turbocharger 16 but also the small volume turbocharger 18 are not carrying out a supercharging operation, the pressure P6 is low and thus the actuator 404 allows the intake control valve 402 to open, whereby a sufficient amount of air can be introduced into the engine 10 via the intake bypass passageway 400, as shown by an arrow V, to thereby improve the engine performance in a low speed condition.

When the intake pressure P6 is increased due to the supercharging operation of the turbochargers 16 and 18, the actuator allows the intake bypass valve 402 to close whereby the intake bypass passageway 400 is closed. The operation thus is the same as that of the first embodiment of FIG. 1.

Although embodiments of the present invention have been described with reference to the attached drawing, many modifications and changes can be made by those skilled in this art without departing from the scope and spirit of the present invention.

We claim:

1. An internal combustion engine comprising:
   (a) an engine body;
   (b) an intake system connected to the engine body for an introduction of a combustible mixture of gas thereto;
   (c) an exhaust system connected to the engine body for a removal of combustion gas therefrom;
   (d) a first stage large volume turbocharger having a turbine wheel arranged in the exhaust system and driven by a flow of exhaust gas and a compressor arranged in the intake system and mechanically connected to the turbine to pressurize the intake air;
   (e) a second stage small volume turbocharger having a turbine arranged in the exhaust system upstream of the turbine wheel of the first stage large volume turbocharger in the direction of the flow of exhaust gas, and driven by the flow of exhaust gas, and a compressor arranged in the intake system downstream of the compressor of the first stage large volume turbocharger in the direction of the flow of intake air to further pressurize the intake air;
   (f) an exhaust bypass passageway connected to the exhaust system and bypassing the turbine of the second stage small volume turbocharger;
   (g) an exhaust bypass control valve arranged in said exhaust bypass passageway for controlling an amount of exhaust gas bypassing the second stage small volume turbocharger; and
   (h) bypass control means, responsive to the intake pressure downstream from each compressor of the first and second stage turbochargers, for controlling the exhaust bypass control valve in such a manner that the bypass control valve opens at a first rate as a function of increasing engine speed after said pressure downstream from the compressor of the second stage turbocharger reaches a predetermined value, and opens at a second rate, greater than the first rate, after the intake pressure downstream from the compressor of the first stage turbocharger reaches said predetermined value.

2. An internal combustion engine according to claim 1, wherein said bypass control means comprise a connecting member connected to the exhaust bypass valve and movable in a first direction to open the exhaust bypass valve and in an opposite second direction to close the valve, a first flexible member, means for coupling the first flexible member to the connecting member for moving the connecting member in at least one of said first and second directions, a spring urging the first flexible member in a direction to allow the bypass control valve to close, a control chamber on one side of the first flexible member, the control chamber being connected to the intake system downstream of the second stage small volume turbocharger so that the bypass control valve starts to open when said pressure reaches a predetermined pressure value, and means responsive to a difference between a pressure of the intake air downstream of the compressor of the second stage small volume turbocharger and a pressure of the intake air downstream of the compressor of the first stage large volume turbocharger for increasing the opening rate of the exhaust bypass control valve as a function of increasing engine speed when said pressure difference between the intake pressure downstream of the compressor of the second stage turbocharger and the pressure downstream of the compressor of the first stage turbocharger becomes substantially zero.

3. An internal combustion engine according to claim 2, wherein said means for increasing the opening rate of the bypass valve comprise means for defining a second control chamber, means for allowing a selective introduction of a control pressure into the second chamber in accordance with said pressure difference; and means responsive to introduction of the control pressure into said second control chamber and coupled to said connecting member for urging the connecting member in a direction to open the exhaust bypass valve.

4. An internal combustion engine according to claim 3, wherein said means for defining a second control chamber comprise a second flexible m ember forming aside of said second chamber, a second spring acting on the second flexible member, and means for transmitting movement of the second flexible member to the connecting member for increasing the opening rate of the exhaust bypass valve as a function of increasing engine speed when the control pressure is introduced into the second control chamber.

5. An internal combustion engine according to claim 4, wherein said transmitting means comprise an engaging plate fixed to the second flexible member and an engaging projection on the connecting member, the engaging plate being urged by said second spring so that the engaging plate is disengaged from the engaging projection, the control pressure on the second chamber allowing the engaging plate to be engaged with the engaging projection to increase the speed of opening of the exhaust bypass valve.

6. An internal combustion engine according to claim 4, wherein said transmitting means comprise a second connecting member separate from the first connecting member for coupling the first connecting member to the exhaust bypass valve, and an engaging plate connected to the second connecting member and the second flexible member, said second spring urging the engaging plate into contact with the first connecting member, and the control pressure when introduced into the second chamber moving the engaging plate out of contact with the first connecting member, to increase the opening rate of the exhaust bypass valve.

7. An internal combustion engine according to claim 3, wherein said defining means comprise a second flexible member forming one side of the second control chamber, a valve means for allowing the second control chamber to ·be usually open to the atmosphere, and means for communicating the control pressure as a negative pressure to the second control chamber for closing the valve means so that the pressure difference between the first and second control chambers is increased to increase the speed of opening of the exhaust bypass valve.

8. An internal combustion engine according to claim 3, wherein said defining means comprise a tubular member having a diameter smaller than an outer diameter of the first flexible member, means for connecting a first end of the tubular member to said first flexible member, and means connecting the interior of the tubular member to said means for allowing a selective introduction of the control pressure into the second control chamber for causing a force corresponding to the diameter of the tubular member to be applied to the diameter of the tubular member to be applied to the first flexible member when the intake pressure is introduced into the second control chamber.

9. An internal combustion engine according to claim 8, wherein said means connecting the interior of the tubular member to said means for allowing a selective introduction of the control pressure into the second control chamber comprise a hollow rod member having one end open to the interior of the tubular member and a second end connected to the means for allowing a selective introduction of the control pressure into the second control chamber, said tubular member being slidable with respect to said hollow rod member.

10. An internal combustion engine according to claim 9, further comprising an end plate connected to the first flexible member, said end plate having a recess directed toward the first flexible member, the first end of said tubular member being connected to a bottom end of the recess.

11. An internal combustion engine according to claim 3, wherein said defining means comprise a bellows having a first end connected to the first flexible member and a second end connected to the means for allowing a selective introduction of the control pressure into the second control chamber.

12. An internal combustion engine according to claim 2, wherein said speed control means comprise a three-way valve having a first position at which the first control chamber is connected to the intake system downstream of the compressor of the second stage small volume turbocharger and a second position where the first control chamber is open to the atmosphere, and means for providing a pulse signal to the three-way valve so that the duty ratio of the pulse signal is varied in accordance with the engine speed, whereby the speed of opening of the exhaust bypass valve becomes higher as the engine speed is increased.

13. An internal combustion engine according to claim 2, further comprising an intake bypass passageway having a first end connected to the intake passageway upstream of the compressor of the first stage large turbocharger and a second end connected to the intake system downstream of the compressor of the second stage small volume turbocharger, an intake bypass valve member for usually opening the intake bypass passageway, and actuator means for closing the intake bypass valve member when the intake pressure is higher than a predetermined value, whereby the engine performance during a low speed condition is improved, although the first stage large volume turbocharger and the second stage small volume turbocharger are not fully activated.

14. An internal combustion engine according to claim 2, further comprising an intake bypass passageway connected to the intake system to bypass the compressor of the second stage small volume turbocharger, an intake bypass control valve for usually closing the intake bypass passageway, and actuator means for opening the intake bypass valve when the difference between the pressure downstream of the compressor of the first turbocharger and the pressure downstream of the compressor of the second turbocharger is reduced.

15. An internal combustion engine according to claim 14, wherein said actuator means comprise a diaphragm actuator having a diaphragm connected to the intake bypass valve, a spring urging the intake bypass valve into a closed position, a control chamber on one side of the diaphragm, and an electric control switching valve for selectively introducing an intake pressure into said control chamber.

16. An internal combustion engine according to claim 15, further comprising a second chamber on the other side of the diaphragm, and means for permitting the second chamber to be under a vacuum pressure to positively close the intake bypass valve when a large difference between the pressure downstream of the compressor of the first turbocharger and the pressure downstream of the compressor of the second turbocharger exists.

17. A valve assembly adapted for controlling a bypass valve in a bypass passageway bypassing a turbine of a small volume turbocharger located nearer an engine than a large volume turbocharger in a sequential turbocharger system, said valve assembly comprising a valve member arranged in the bypass passageway; a connecting member connected to the valve member; a flexible member arranged to move the connecting member in at least one direction; a spring urging the flexible member in a direction to allow the bypass control valve member to close; a control chamber on one side of the flexible member, the control chamber being connected to the intake system downstream of the second stage turbocharger so that the valve member starts to open when the pressure level in the control chamber is higher than a predetermined level; means for defining a second chamber; and means for introducing a control pressure into the second control chamber for generating an additional force to be transmitted to the connecting member to increase the rate of opening movement of the valve member.

18. A valve assembly according to claim 17, wherein said means for defining a second control chamber comprise a second flexible member forming a side of said second chamber, a second spring for urging the second flexible member, and means for transmitting movement of the second flexible member to the connecting member in response to introduction of the control pressure into the second control chamber for increasing the opening rate of the intake bypass valve as a function of increasing engine speed.

19. A valve assembly according to claim 18, wherein said transmitting means comprise an engaging plate on the second flexible member and an engaging projection on the connecting member, the engaging plate being urged by said second spring so that the engaging plate is disengaged from the engaging projection, the control pressure on the second chamber allowing the engaging plate to be engaged with the engaging projection to increase the speed of opening of the exhaust bypass valve.

20. A valve assembly according to claim 18, wherein said transmitting means comprise a second connecting member separate from the first connecting member for coupling the first connecting member to the exhaust bypass valve, an engaging plate connected to the second connecting member and the second flexible member, and a spring urging the engaging plate into contact with the connecting member.

21. A valve assembly according to claim 17, wherein said defining means comprise a second flexible member forming one side of the second control chamber, a valve for allowing the second control chamber to be usually opened to the atmosphere, and means for communicating the control pressure as a negative pressure to the second control chamber for closing the valve so that the pressure difference between the first and second control chambers is increased to increase the speed of opening of the exhaust bypass valve.

22. A valve assembly according to claim 17, wherein said defining means comprise a tubular member having a diameter smaller than an outer diameter of the first flexible member, means for connecting a first end of the tubular member to said first flexible member, and means connecting the interior of the tubular member to said means allowing selective introduction of the control pressure into the second control chamber for causing a force corresponding to the diameter of the tubular member to be applied to the first flexible member when the intake pressure is introduced into the second control chamber.

23. A valve assembly according to claim 22, wherein said means connecting the interior of the tubular member to said means for allowing a selective introduction of the control pressure into the second control chamber comprise a hollow rod member having one end open to the interior of the tubular member and a second end connected to the means for allowing a selective introduction of the control pressure into the second control chamber, said tubular member being slidable with respect to said hollow rod member.

24. A valve assembly according to claim 23, further comprising an end plate connected to the first flexible member, said end plate having a recess directed toward the first flexible member, the first end of said tubular member connected to a bottom end of the recess.

25. A valve assembly according to claim 22, wherein said defining means comprise a bellows having a first end connected to the first flexible member and a second end connected to the means for allowing a selective introduction of the control pressure into the second control chamber.

* * * * *

UNITED STATES PATENT AND TRADEMARK OFFICE
CERTIFICATE OF CORRECTION

PATENT NO. : 5,063,744

DATED : Nov. 12, 1991

INVENTOR(S) : Shinobu Ishiyama, et al.

It is certified that error appears in the above-identified patent and that said Letters Patent is hereby corrected as shown below:

Column 2, line 1, delete the comma after "which".

Column 4, line 63, change "28" to --18--.

Column 5, line 56, delete "the" between "to" and "atmospheric".

Column 6, line 42, change "spring 60" to --spring 76--.

Column 6, line 67, change "increase" to --increases--.

Column 7, line 48, change "increase-d" to --increased--.

Column 8, line 3, change "P set" to --Pset--.

Column 8, line 23, change "closes" to --closed--.

Column 8, line 39, change "second" to --first--.

Column 9, line 13, change "k1 plus k2" to --k1 and k2--.

Column 10, line 7, delete "As a result," and start sentence --A large spring--.

Column 10, line 27, change "increased accordingly" to --increased. Accordingly,--.

UNITED STATES PATENT AND TRADEMARK OFFICE
CERTIFICATE OF CORRECTION

PATENT NO. : 5,063,744

DATED : Nov. 12, 1991

INVENTOR(S) : Shinobu Ishiyama, et al.

It is certified that error appears in the above-identified patent and that said Letters Patent is hereby corrected as shown below:

Column 11, line 10, change "1 1" to --$1_1$--.

Column 11, line 15, change "is" to --becomes--.

Column 11, line 63, between "degree" and "opening" insert --of--.

Figure 11:
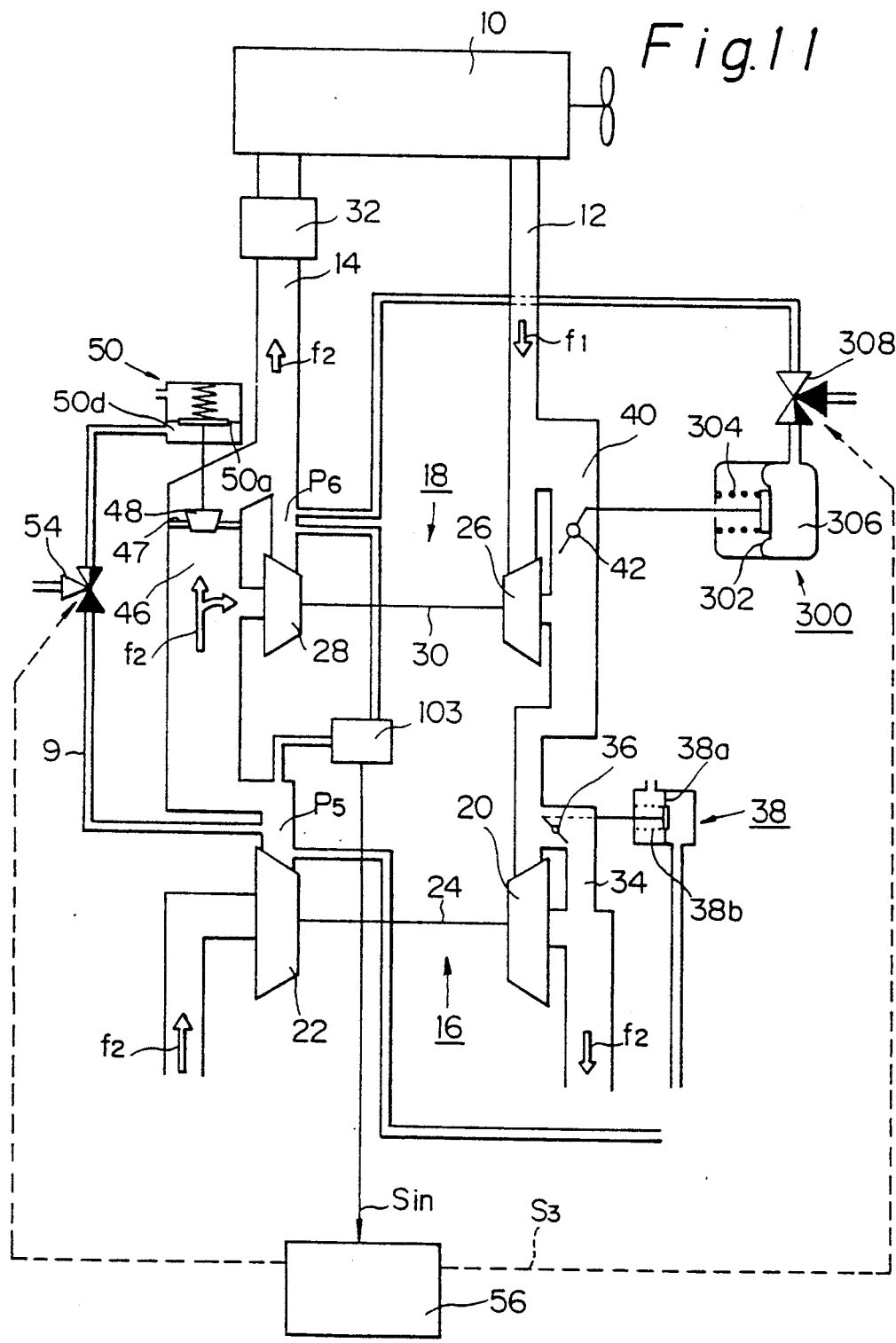
FIG. 11 is an embodiment of a turbocharger system according to the present invention which employs an intake bypass control valve actuator having only one diaphragm controlled by duty signals.

Column 12, line 52, change FIG. 1" to --FIG. 11--.

Column 15, line 27, change "m ember" to --member--.

Column 15, line 28, change "aside" to --a side--.

Signed and Sealed this

Twenty-seventh Day of April, 1993

*Attest:*

MICHAEL K. KIRK

*Attesting Officer*    *Acting Commissioner of Patents and Trademarks*